Figure 1:
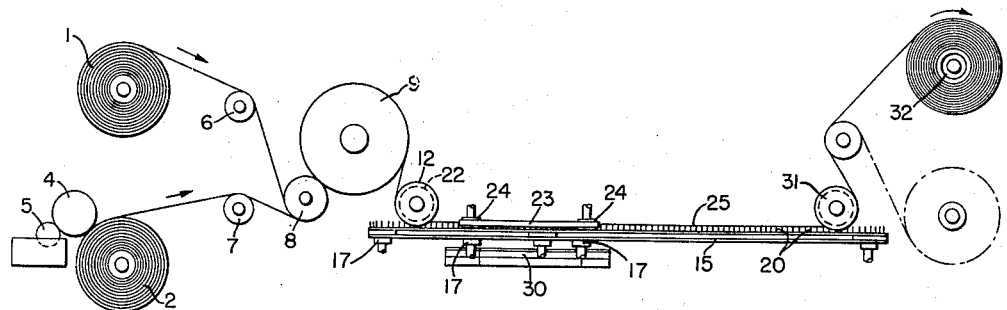

Dec. 30, 1958     P. J. VAUGHAN     2,866,231
METHOD OF STRETCHING RUBBER HYDROCHLORIDE FILM
Filed July 11, 1956

INVENTOR.
PAUL J. VAUGHAN
BY
ATTORNEY

United States Patent Office 2,866,231
Patented Dec. 30, 1958

2,866,231

METHOD OF STRETCHING RUBBER HYDROCHLORIDE FILM

Paul J. Vaughan, Cuyahoga Falls, Ohio, assignor to The Goodyear Tire & Rubber Company, Akron, Ohio, a corporation of Ohio Application July 11, 1956, Serial No. 597,290

2 Claims. (Cl. 18—48)

This invention relates to stretching rubber hydrochloride film which is crystalline at ordinary temperatures and becomes amorphous on heating. The film is stretched longitudinally and then laterally to at least double its unstretched area. The temperature of the two stretching operations is regulated in such a way that the resulting stretched film is non-blocking, i. e., it is free of tack and can immediately be wound for shipment, etc.

Unstretched rubber hydrochloride film is crystalline. It is formed by casting a solution or dispersion of hydrochlorinated rubber in benzene or other volatile solvent, and then vaporizing the solvent. It is understood that rubber hydrochloride is composed of molecules (or molecular aggregates) of different weight, the larger of which melt and become amorphous at a higher temperature than the smaller. On heating, the smaller molecules melt first, and progressively larger molecules are melted as the temperature is increased. On stretching such film which has been heated only sufficiently to melt the smaller molecules, these molecules which are amorphous and are dispersed throughout the film mass, plasticize the larger and crystalline molecules and facilitate the stretching operation. Stretching causes the amorphous molecules to recrystallize. Amorphous molecules in the stretched film make it tacky or sticky. According to this invention the heating and stretching are so coordinated that there is no more than a little amorphous rubber hydrochloride remaining after the final stretching, so little that the stretched film is substantially free of stickiness and may be immediately wound without fear of the overlapping plies adhering to one another.

There is a substantial difference between the usual methods of stretching thermoplastic films longitudinally and laterally. In the methods of stretching longitudinally, the heated film passes from a roller operated at a lower speed to a roller operated at a higher speed, and the stretching occurs in a constantly changing narrow area of the film which extends from one edge of the film to the other. This area is so narrow that the operation has been described as line-stretching. If the film is heated while in contact with the first roller, the "line" along which it is stretched is the area of the film which is leaving the roller. This is where the stretching occurs. If the film is heated by the heat of the roller or higher speed as it approaches this roller, the "line" along which the stretching occurs is the narrow area in which the film becomes heated to the stretching temperature just before it contacts this roller.

Lateral stretching is quite different. Stretching means are located at opposite edges of the film. This stretching is progressive and continuous over a wide unsupported area of the film which extends from one stretching means at one edge of the film to the stretching means at the other edge.

According to this invention, rubber hydrochloride film is first stretched longitudinally and then laterally. All of the heat required for the longitudinal stretching is supplied to the unstretched film. On stretching, substantially all of the amorphous molecules of the rubber hydrochloride become crystalline. The film is then heated again to resoften the smaller molecules so as to supply plasticizer for the later stretching. This reheating operation is preferably progressive, so that as the film is stretched and the amorphous rubber hydrochloride tends to crystallize, more heat is supplied so that at all times the amount of amorphous rubber hydrochloride is small, not sufficient to make the film sticky.

Two or more rubber hydrochloride films may be subjected to the lateral stretching at the same time, and be united simultaneously with the stretching. They need not both be stretched longitudinally. One or more of these films may be printed. By printing a surface which is to be laminated to another ply of the film, the printing in the final product is sandwiched between the two plies and is not affected by any subsequent treatment of the laminated product. Thus, the laminated product may be dipped in hot water or be otherwise treated without affecting the printing. This is a valuable attribute in film such as that herein disclosed, which is adapted for use in shrink-wrapping, i. e., enclosing an object—preferably an object of irregular shape—in the film, and then by dipping in hot water or otherwise heating, shrinking the film to fit tightly around the object.

The invention will be further described in connection with the accompanying drawings, in which—

Figure 2:
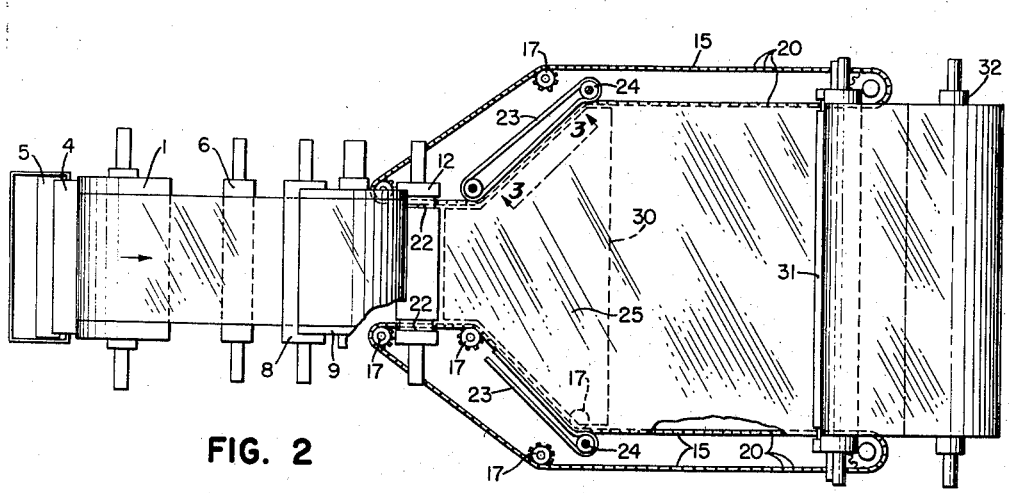
Figure 3:
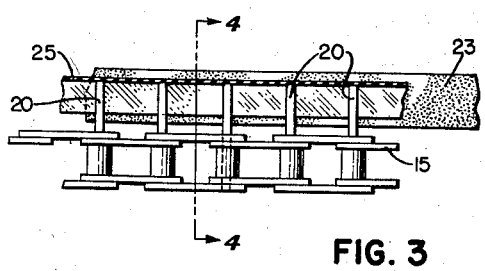
Figure 4:
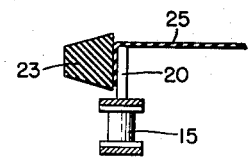

Fig. 1 is an elevation of the equipment employed;
Fig. 2 is a plan view of the same;
Fig. 3 is an elevation in detail, on the line 3—3 of Fig. 2, showing the tentering chain and the V-belt which holds the film on the tentering chain; and
Fig. 4 is a section on the line 4—4 of Fig. 3.

The drawing shows two stock rolls 1 and 2 for the unstretched rubber hydrochloride film. These may be used alternatively to supply film for the production of single-ply stretched film, and both will be used simultaneously to supply films for the production of laminated film. In the production of laminated film the undersurface of the top roll, or the upper surface of the bottom roll may be printed. The roll 4 is a printing roll which is inked by the inking roll 5. The ink employed is a quick-drying ink and may be adhesive after removal of the solvent.

From the stock rolls the films pass over ironing rolls 6 and 7 and under the rubber draw roll 8. Thence they pass over the heated drum 9. This drum heats the one or more films to the desired temperature. If more than one film is employed, the films are laminated as they pass around the heated drum 9.

From the heated drum the film (whether laminated or a single ply) passes under the stretching roll 12. It is operated at a higher surface speed than the heated drum and may, for example, have a speed twice that of the heated drum. Its speed may be anywhere from one and one-half times that of the heated drum to as much as three or more times that of the heated drum. The roll 12 is advantageously a rubber roll or a rubber-covered roll to prevent slippage of the film on its surface, and also because a rubber surface is more quickly heated to the temperature of the heated film than a metal surface.

This longitudinally stretched film is then stretched laterally by any one of various means. The preferred equipment is a tentering device not unlike that employed in the treatment of cloth. The tentering chains 15 travel around the sprockets 17, and their rate of travel is the same as that of the surface of the roll 12. Every link of each chain (or every few links) is provided with a pin 20 (Fig. 3) and the edges of the film are pressed over these pins as the pins travel through slots 22 near the ends of the roll 12. The pins are not pointed, but have rounded ends. They do not puncture the film because the punctured film would tear when placed under tension. The film is merely folded over the pins, and as the film and pins leave the slots, the V-belts 23 snub the folded edges of the film tight against the sides of pins. This is clearly shown in Fig. 3. In practice, the film may sag somewhat between the pins.

The tentering chains diverge and stretch the film laterally. The V-belts hold the edges of the portion 25 of the film against the sides of the pins 20 during the lateral stretching.

The plate 30 is heated and radiates sufficient heat to the film to maintain a small portion of the rubber hydrochloride amorphous during most or all of the lateral stretching. The distance from the film to the plate is about one inch.

When the film reaches the end of the tentering chain it passes around the stripping roll 31 and thence to the wind-up roll 32. Ordinarily a second such roll is provided, as shown in the drawing, so that when one roll is full, the film may be wound on to the second roll without any interruption of the stretching operation. The film may subsequently be re-wound as is customary.

If the heat for both stretching operations, that is the longitudinal and lateral stretching, were imparted to the film prior to the longitudinal stretching, it would be necessary to heat the film to such a temperature that a relatively high percentage of the rubber hydrochloride would be melted. This would make the film tacky, and the tack would persist in the film; and at the wind-up roll the tacky layers would adhere to one another and bind, so that it would be impossible to unroll the film. The retention of tackiness after cooling is a characteristic of rubber hydrochloride film, and probably very few other films, although possessed to some extent by film of vinylidene chloride-vinyl chloride. The stretching of such other films is included within the scope of this invention, although in the treatment of such films other temperatures will be employed.

The rubber hydrochloride films employed for stretching generally include 5 to 10 parts of an ester plasticizer such as butyl stearate, etc., per 100 parts of the rubber hydrochloride. The temperatures referred to herein apply more particularly to the treatment of such film. Ordinarily, unplasticized film is not used for stretching, but for stretching such film a temperature in the neighborhood of 5 degrees above the temperatures more particularly described is employed. For film more highly plasticized, temperatures in the neighborhood of 5 degrees lower than those more particularly described are employed. Although it is not usual to stretch film with a plasticizer content as great as 50 to 60 parts per 100 parts of the rubber hydrochloride, such films can be stretched at temperatures as low as 160° F.

Ordinarily the drum 9 will be heated to a temperature between 205 and 220° F. The plasticity imparted to a film by heating varies somewhat with the time during which the film is heated to any particular temperature. In the treatment of rubber hydrochloride film about 0.0015 inch thick containing 5 to 10 percent of ester plasticizer, with a heating drum 9 which is 12 inches in diameter, operating at a surface speed of 20 to 45 feet per minute, and with the roll 12 operating at twice the speed of the drum 9, very satisfactory results were obtained.

This film, stretched to double its original length, was then passed over the plate 30 heated to a temperature of 325° F. at a speed of 40 to 90 feet per minute. The film was about one inch above the heated plate and was heated to a temperature of about 170 to 190° F. Here, by means of the tentering chain, the width of the film was doubled. Thus, the resulting film had four times the area of the starting film.

This temperature range was found satisfactory even though the speed of the film was changed quite substantially. At higher temperatures the film became so plastic that it tore around the pins on the tentering chain.

Using these conditions of operating, with the wind-up roll located some six or eight feet from the nearest edge of the plate 30, the temperature of the film at the wind-up roll was about 100° F. It was free from tack.

As film is stretched longitudinally in passing from the heated drum to the roll 12, the percentage of the rubber hydrochloride which is crystalline is increased. A film which is entirely crystalline is not tacky. The greater the content of crystalline rubber hydrochloride in the film, the more difficult it is to stretch the film. The heat generated by the stretching of the film as it passes from the drum 9 to the roll 12 is one of the factors which tends to increase the percentage of amorphous material in the film and lower its yield point. However, the film, and particularly the stretched film, is quite thin, and because of its large surface radiates heat rapidly. If the film were not heated after leaving the roll 12, it would rapidly cool to a temperature at which stretching would be difficult. By supplying heat during the lateral stretching operation, the maximum temperature required at any time during the entire process is reduced.

During this lateral stretching, or just prior to it, the longitudinally stretched film may be heated to a temperature above that recommended in the foregoing example where, as explained, heat is supplied to the film throughout the entire lateral stretching step, but at no time is the film heated above the initial heating temperature of not over substantially 220° F.

The heating plate is substantially coextensive with the area 25 of lateral stretching, so that after leaving the proximity of the heating plate, no further stretching occurs. Beyond the stretching area 25, the width of the film is maintained by the tentering chains until the film has cooled below the temperature at which shrinking occurs.

If the finished film is subsequently heated sufficiently, it will lose much or all of its stretch. This property of shrinking at an elevated temperature is utilized by sealing an object in the stretched film, and then heating the film to shrink it so that it forms a close fit around the object. Thus, if a piece of unstretched film measuring five units in both directions is stretched longitudinally and then laterally, under the conditions here described, its final dimensions will be ten units in both directions. By immersion in boiling water it will tend to shrink to an area measuring about six units in both directions. Of course, if the film is employed to enclose an object, the area of film employed will be such that the object will prevent maximum shrinkage. In this way the film is shrunk tight against the object even though the object have an irregular contour. Thus, if an object is enclosed in a finished film of this invention, which has been stretched to 400 percent of its original area (as in the example), and the packaged object is then immersed in boiling water, the film shrinks some 35 to 40 percent in both directions.

For example, one may start with a single ply of film measuring 0.0016 inch thick, or two plies of film each measuring 0.0008 inch thick and laminate them. If two such thin plies are used and laminated, one or both of these plies may be printed on the inner surface. When such film is first stretched longitudinally to double its length, and then laterally to double its width, the final gauge will be a relatively thin film 0.0004 inch thick. Rubber hydrochloride film of this thickness has good grease-proofing properties and is valuable for coating paper, cardboard, etc. Likewise, it is moisture proof, although the degree of moistureproofness depends upon its content of plasticizer, etc.

For various operations it may be desirable to stabilize the stretched film so that it can be heated to a relatively high temperature without shrinking. To accomplish this purpose the finished film is heated to a temperature about 20 degrees above the elevated temperature at which the film is to be used and this is done while the film is held taut so that it will not shrink. Thereafter the film may be used at the desired elevated temperature without danger of shrinking. Thus, for example, film which is to be made stable at high summer temperatures as, for example, at 120° F., will be heated to about 140° F. for several minutes while under tension.

The invention is covered in the claims which follow.

What I claim is:

1. The method of stretching rubber hydrochloride film containing substantially 5 to 10 parts of ester plasticizer per 100 parts of the rubber hydrochloride, which comprises heating the film to a temperature of 205 to 220° F. and then immediately stretching the film to at least substantially double its length, and then immediately stretching the film to at least substantially double its width while supplying heat to it during a substantial part of the period of lateral stretching and maintaining it at a temperature of substantially 170 to 190° F. during said lateral stretching.

2. The process of claim 1 in which the film after the second stretching is cooled by radiation to a temperature of substantially 100° F. and then wound up on a wind-up roll.

References Cited in the file of this patent

UNITED STATES PATENTS

| | | |
|---|---|---|
| 2,328,843 | Osterhof | Sept. 7, 1943 |
| 2,429,177 | Young | Oct. 14, 1947 |
| 2,719,323 | Thompson | Oct. 4, 1955 |